Figure 1:
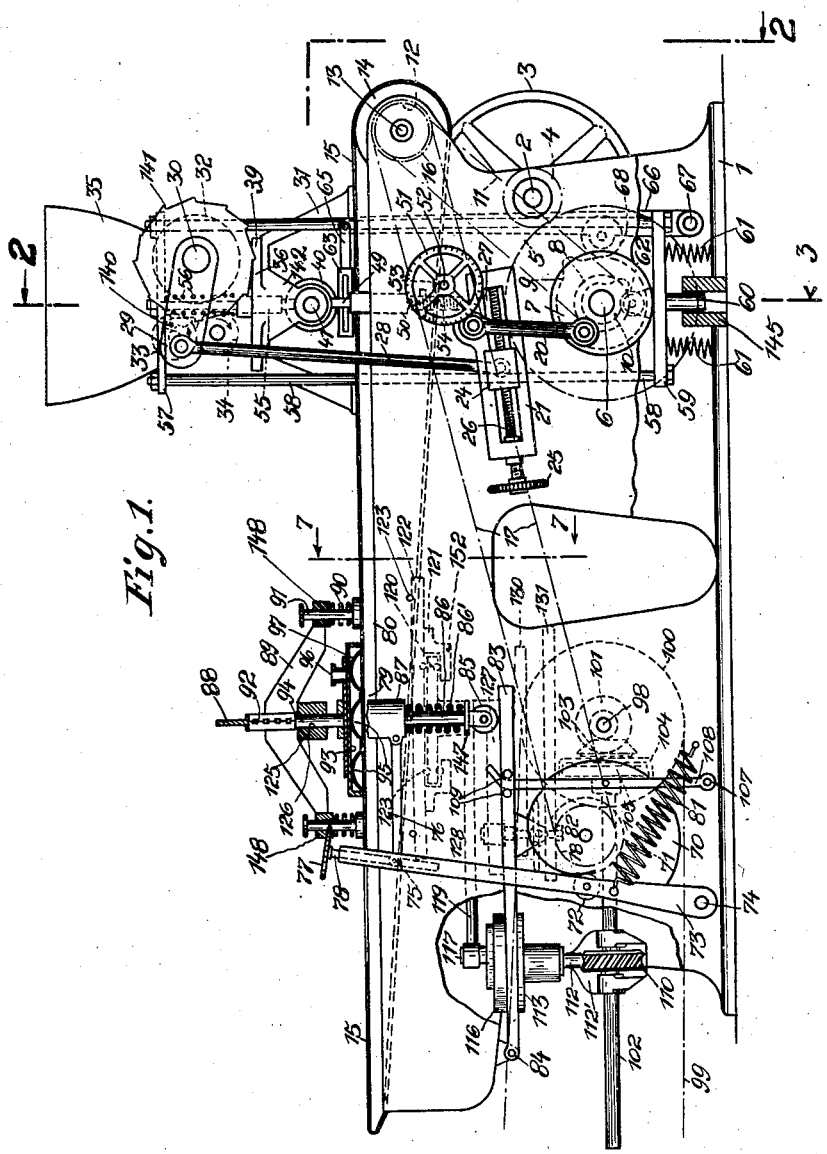

Nov. 18, 1930.    O. KREMMLING    1,782,006
AUTOMATIC DOUGH DIVIDING AND WORKING MACHINE
Filed July 10, 1926    9 Sheets-Sheet 1

Inventor:
Otto Kremmling
by
Locke, Kehlenbeck & Farley
Attorneys

Nov. 18, 1930. O. KREMMLING 1,782,006
AUTOMATIC DOUGH DIVIDING AND WORKING MACHINE
Filed July 10, 1926 9 Sheets-Sheet 2

Inventor:
Otto Kremmling
by
Lorre, Kehlenbeck & Farley
Attorneys.

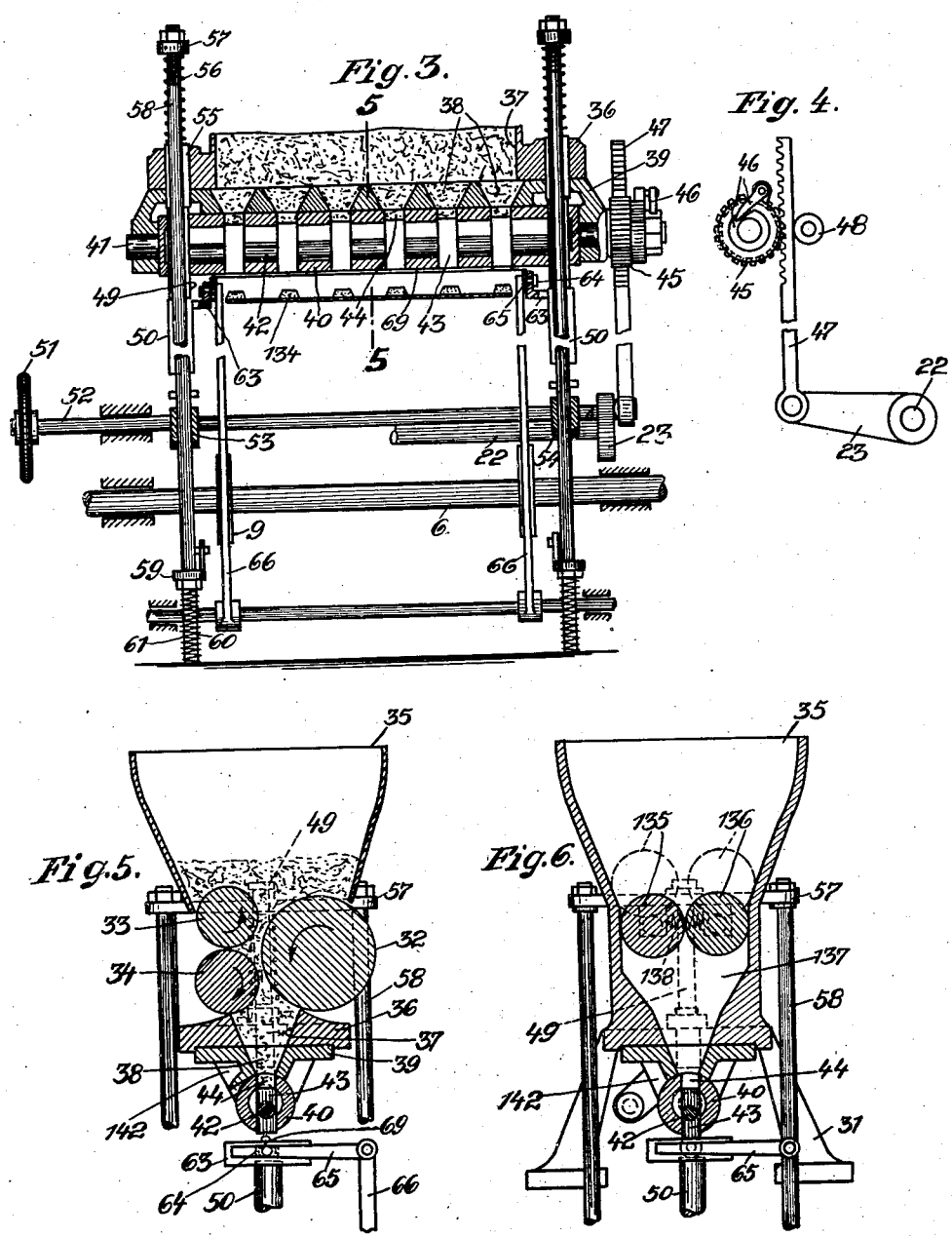

Nov. 18, 1930. O. KREMMLING 1,782,006
AUTOMATIC DOUGH DIVIDING AND WORKING MACHINE
Filed July 10, 1926 9 Sheets-Sheet 4

Inventor:
Otto Kremmling

Nov. 18, 1930.  O. KREMMLING  1,782,006
AUTOMATIC DOUGH DIVIDING AND WORKING MACHINE
Filed July 10, 1926   9 Sheets-Sheet 5
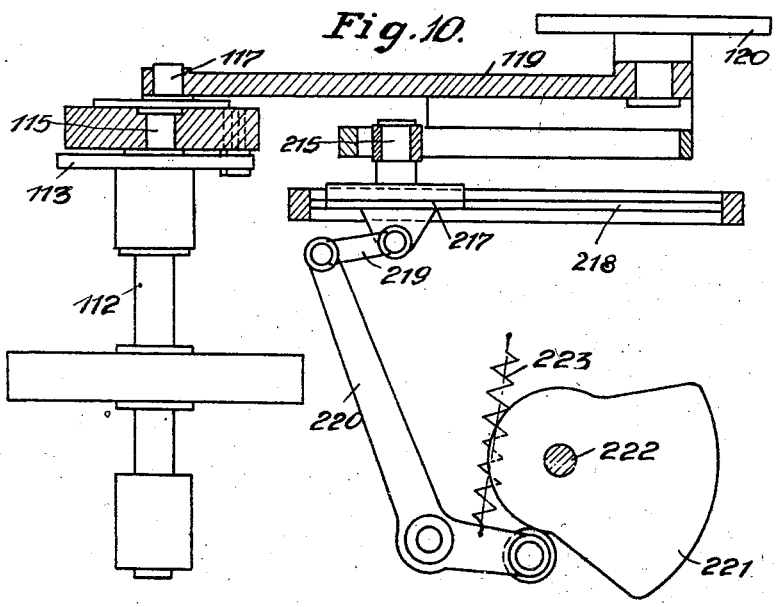
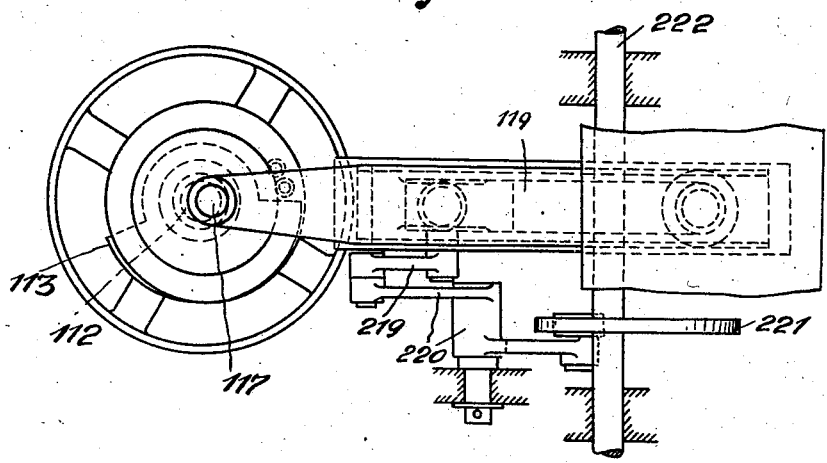
Inventor;
Otto Kremmling
by
Lowe, Kehlenbeck & Farley
Attorneys

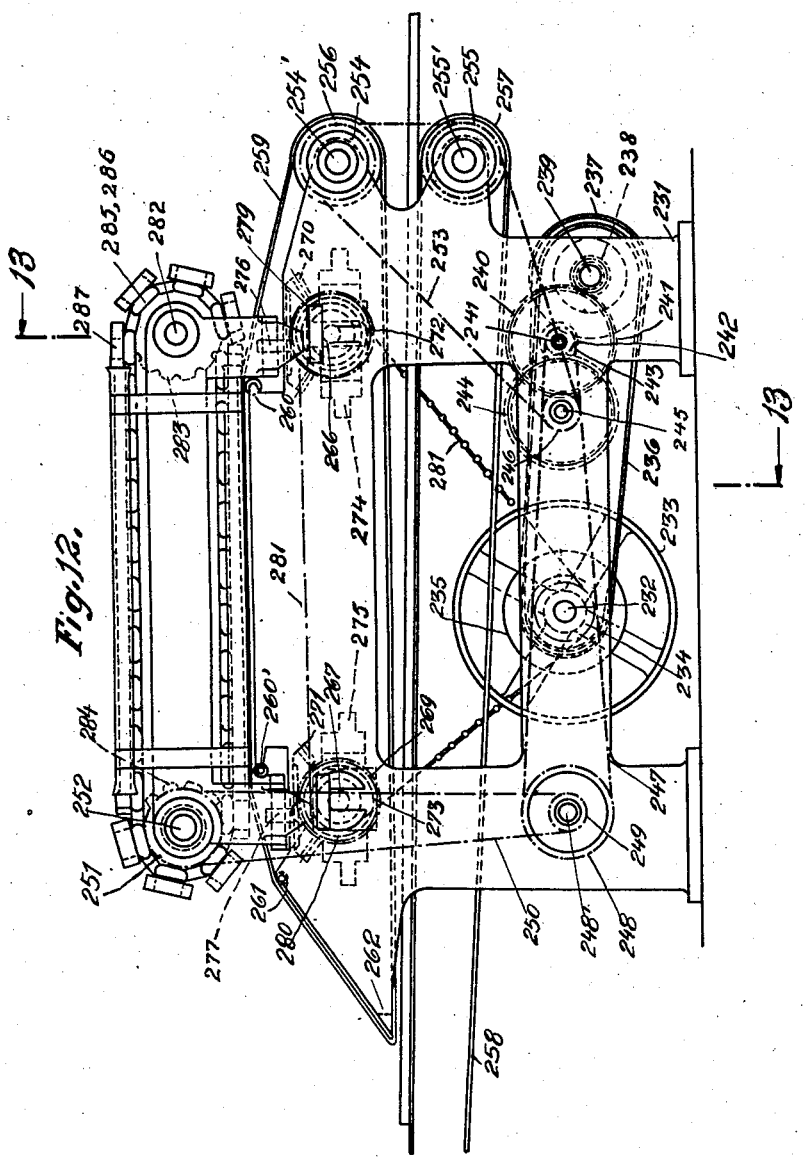

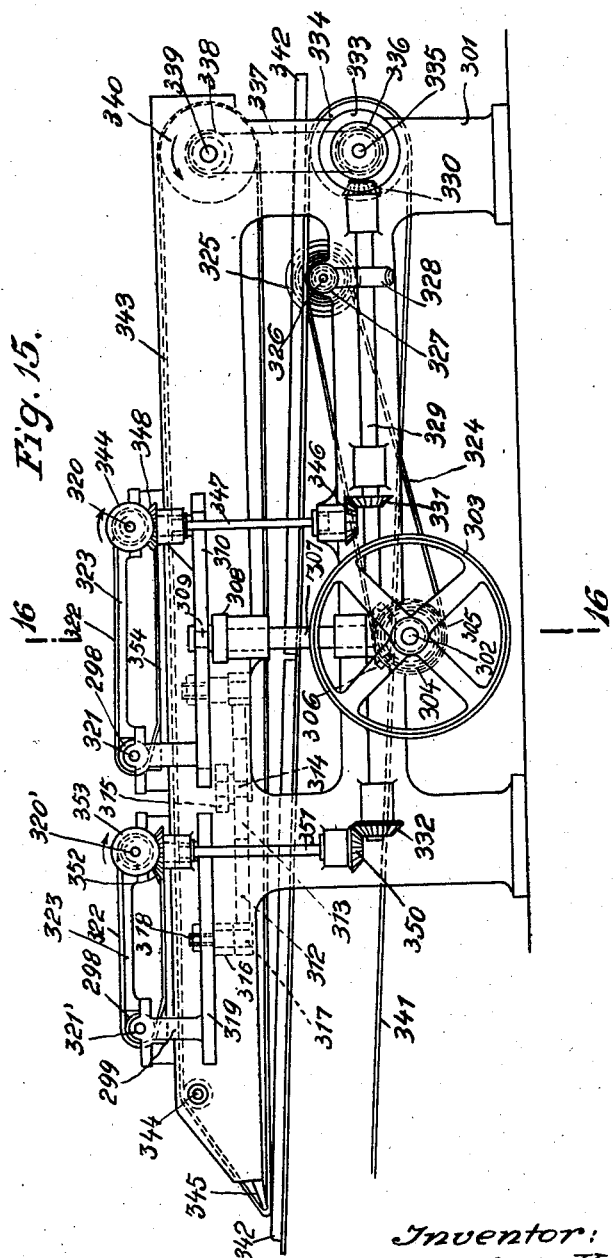

Nov. 18, 1930.  O. KREMMLING  1,782,006
AUTOMATIC DOUGH DIVIDING AND WORKING MACHINE
Filed July 10, 1926   9 Sheets-Sheet 9
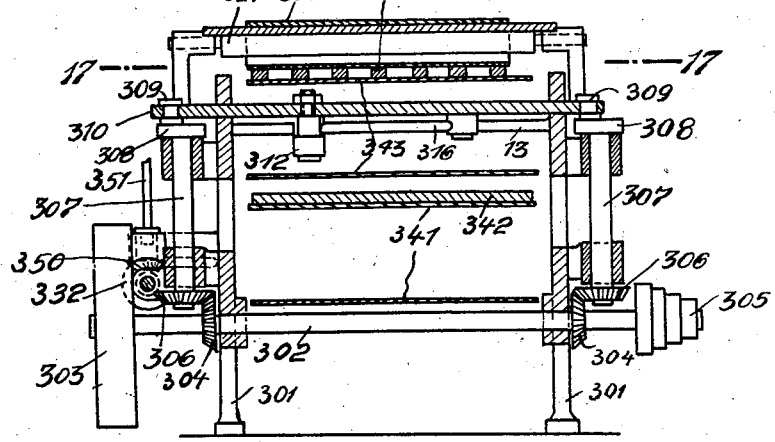
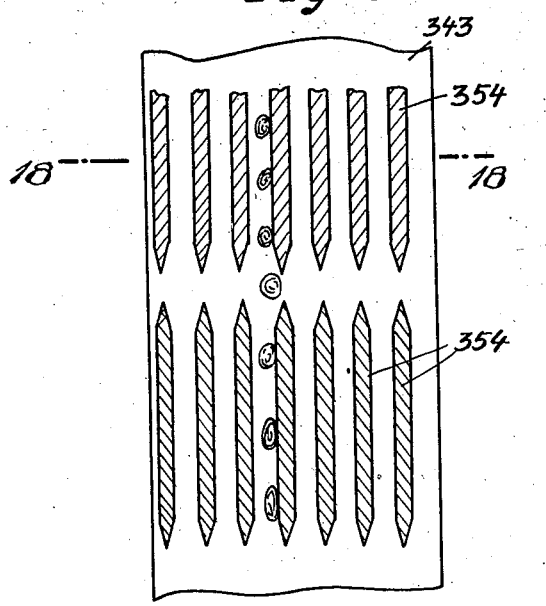
Inventor:
Otto Kremmling
by Locka, Kehlenbeck & Farley
Attorneys.

Patented Nov. 18, 1930

1,782,006

UNITED STATES PATENT OFFICE

OTTO KREMMLING, OF HAMERSLEBEN, NEAR OSCHERSLEBEN, GERMANY

AUTOMATIC DOUGH DIVIDING AND WORKING MACHINE

Application filed July 10, 1926, Serial No. 121,561, and in Germany July 11, 1925.

My invention relates to improvements in automatic dough dividing and working machines, and more particularly in machines of the type comprising dough dividing means, dough working means, and means for conveying the divided pieces or lumps of dough to the working means. The chief object of the improvements is to provide a machine of this class which has a high efficiency, and which can readily be adapted to the dividing and working of dough of different kinds, and in which the main apparatus of the machine, viz. the dividing and working apparatus, cooperate so that high class work is done thereby. Another object of the improvements is to provide a machine by means of which a batch of dough is divided into pieces of uniform size and weight, and in which the dividing and working apparatus can be set so as to vary the size and weight of the pieces of dough supplied thereby, without needing weighing of smaller or larger batches of dough.

With these objects in view my invention consists in providing means for thoroughly working the dough within the dividing apparatus, and for this purpose I provide the dividing apparatus with rollers by means of which the batch of dough is pressed and supplied to the dividing means. Further, I provide the dividing apparatus with chambers adapted to have the dough pressed therein and to supply the pieces of dough to the conveying apparatus. In my improved machine the conveying apparatus consists of an endless tape having a continuous travelling motion even while working the pieces of dough thereon. To permit such continuous movement of the tape and working of the pieces of dough thereon the working apparatus has a travelling movement together with the tape, and after having worked a set of pieces of dough it is returned into initial position for acting on another set of pieces of dough. It will be understood that the working apparatus is provided with one or more series of working cavities or the like, the number of the said series corresponding to the efficiency of the dividing apparatus.

Further, my improved machine is provided with means for dividing the batch of dough into pieces of different sizes and working the said pieces into loaves of different forms. For this purpose the driving mechanism of the working apparatus is constructed so that it is capable of imparting circular, oval, or oblong gyratory working movement, and it is adapted to be set so as to impart any of the said movements while working is continued.

Figure 7:
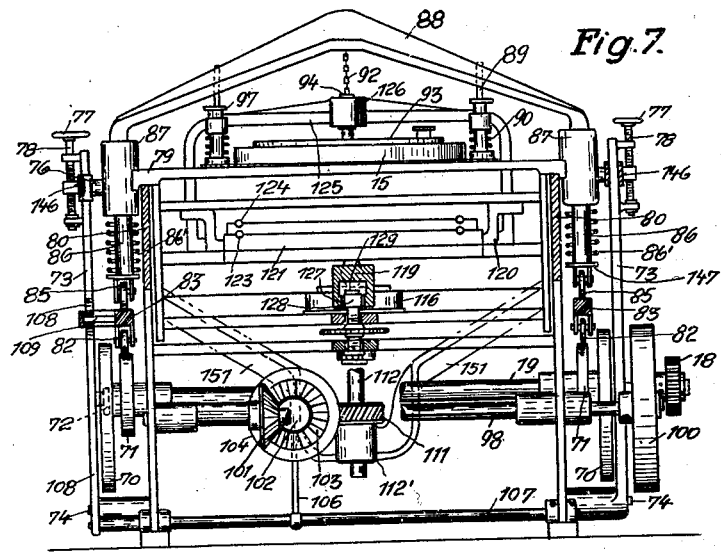
Figure 8:
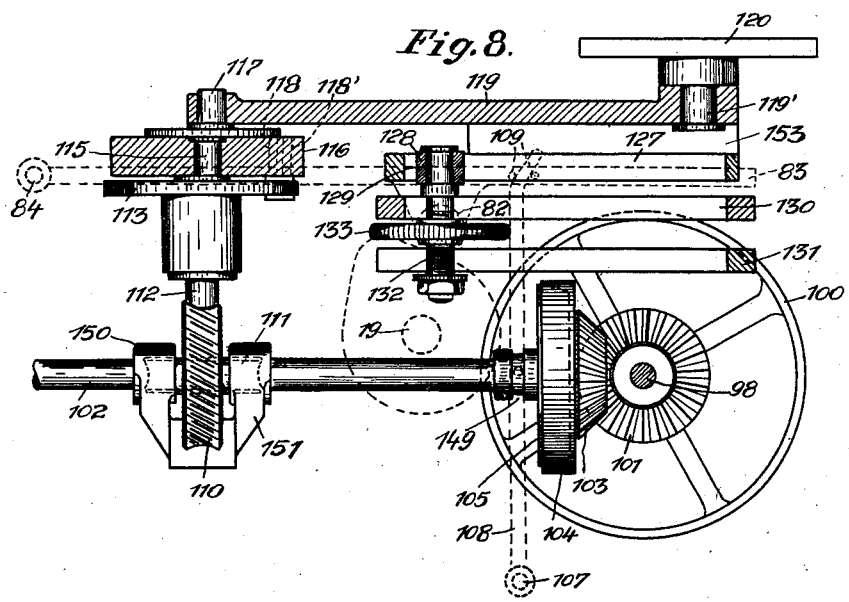
Figure 9:
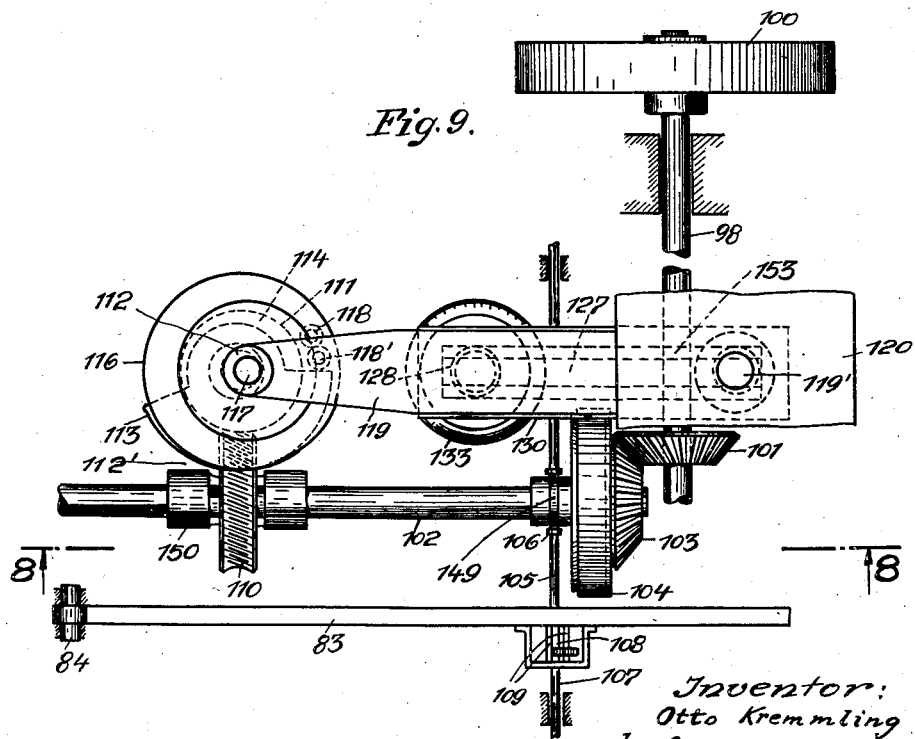
Figure 13:
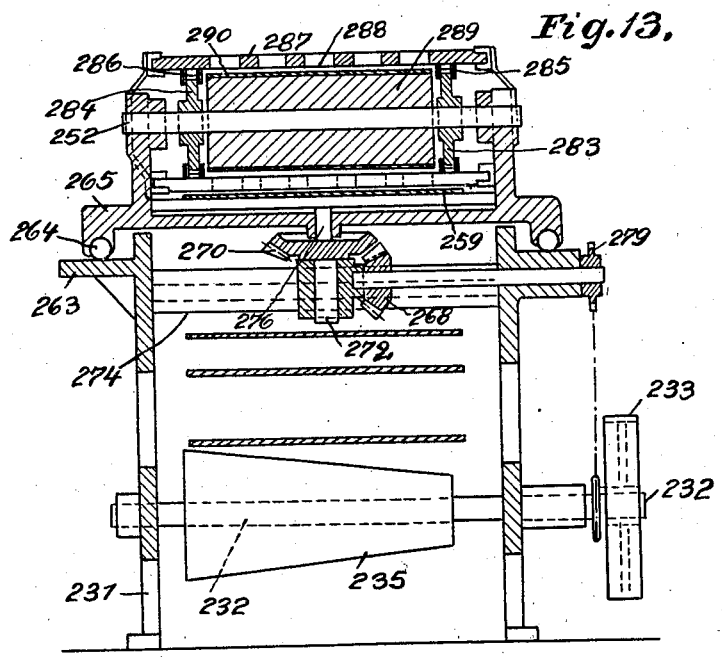
Figure 14:
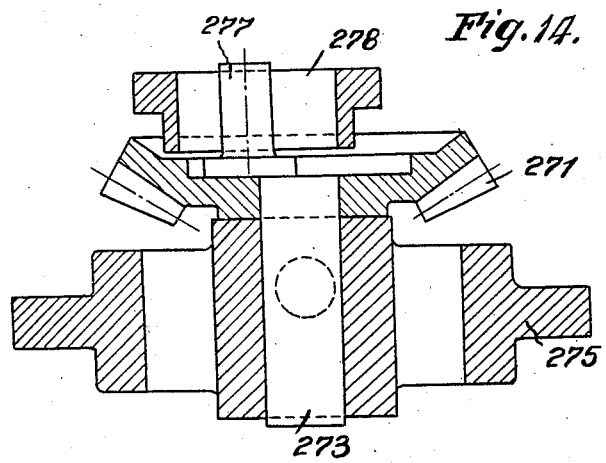

For the purpose of explaining the invention several examples embodying the same have been shown in the accompanying drawings, in which the same reference characters have been used in all the views to indicate corresponding parts. In said drawings, Fig. 1 is an elevation of the machine partly in section and having certain parts of the frame removed in order to show the inner mechanism, Fig. 2 is an elevation partly in section taken on the line 2—2 of Fig. 1 and looking in the direction of the arrows, Fig. 3 is a similar sectional elevation taken on the line 2—3 of Fig. 1, the side frame members and the top part of the container supplying the dough to the dividing apparatus being removed, Fig. 4 is a detail view showing a part of the driving mechanism, Fig. 5 is a sectional elevation taken on the line 5—5 of Fig. 3 and showing the top part of the dividing apparatus, Fig. 6 is a similar sectional elevation showing a modification of the dividing apparatus, Fig. 7 is a sectional elevation taken on the line 7—7 of Fig. 1 and looking in the direction of the arrows, Fig. 8 is a detail sectional elevation on an enlarged scale showing certain parts of the driving mechanism of the working apparatus, the section being taken on the line 8—8 of Fig. 9, Fig. 9 is a top-plan view of Fig. 8, Fig. 10 is a detail view partly in section showing a modification of the mechanism for operating the working head, Fig. 11 is a top-plan view of Fig. 10, Fig. 12 is an elevation showing a modification of the machine, the dough dividing apparatus being omitted, Fig. 13 is a sectional elevation taken on the line 13—13 of Fig. 12, Fig. 14 is a detail sectional elevation on an enlarged scale showing one of the mechanisms for imparting working movement to the working head, Fig. 15, is an elevation showing another modification of the machine, the dividing apparatus being omitted, Fig. 16 is a sectional elevation taken on the line 16—16 of Fig. 15, Fig. 17 is a sectional plan view taken on the line 17—17 of Fig. 16, and Fig. 18 is a sectional elevation on an enlarged scale taken on the line 18—18 of Fig. 17.

Figure 2:
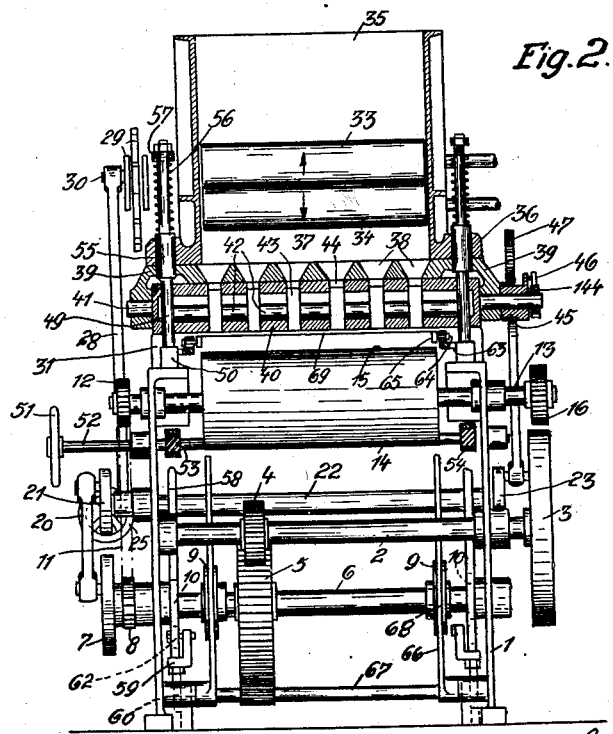

Referring now to the example illustrated in Figs. 1 to 5 and 7 to 9, my improved dough dividing and working machine comprises a frame composed of a bottom part 1 and a top part 31. In bearings of the bottom part 1 a main driving shaft 2 is rotatably mounted, which is adapted to be driven from a suitable source of power by means of a belt pulley 3 keyed thereto. A spur gear 4 carried by the shaft 2 is in engagement with a spur gear 5 keyed to a shaft 6 mounted in the frame 1. The shaft 6 carries a crank disk 7, a sprocket wheel 8, and two pairs of cam disks 9 and 10, the disks of both pairs being located respectively at opposite sides of the machine, as is shown in Fig. 2.

The sprocket wheel 8 is connected by a chain 11 with a sprocket wheel 12 carried by a shaft 13, which shaft carries a drum 14 having a conveying tape 15 trained thereon, and a sprocket wheel 16 connected by a chain 17 with a sprocket wheel 18 carried by a shaft 19. The crank disk 7 is connected by a link 20 with an arm 21 mounted on a shaft 22. The said shaft is mounted in the frame 1, and carries an arm 23. The arm 21 is formed with a longitudinal cut-out portion 27 having a block 24 mounted therein, and the said block is adapted to be shifted in the said cut-out portion longitudinally of the arm 21 by means of a screw-threaded spindle 26 carrying a hand wheel 25. To the block 24 a link 28 is jointed which is connected at its top end to an arm 29 rockingly mounted on a shaft 30 and carrying a pawl 140 engaging in the teeth of a ratchet wheel 141 keyed to the shaft 30. On the said shaft a roller 32 having a milled surface is mounted. On the top frame 31 two rollers 33 and 34 are mounted the surfaces of which are spaced from the surface of the roller 32, but are near to each other. The diameter of the rollers 33, 34 is smaller than that of the roller 32, and all the rollers are operatively connected with each other by gear wheels (not shown) adapted to rotate the rollers in the direction of the arrows shown in Fig. 5, the rollers 32 and 34 rotating in a direction for moving the dough supplied thereto downwardly, and the roller 33 rotating in a direction opposite to that of the roller 32, so that the dough is kneaded between the rollers 32 and 33 before it is fed to the dividing apparatus. Above the rollers 32, 33 and 34 a container or hopper 35 for the dough is located, and below the said rollers there is a transverse member 36 the top face of which is close to the surfaces of the rollers 32 and 34, and which is formed with a tapering passage 37 opening into tapering passages 38 of a transverse member 39 located below the member 36. Below the transverse member 39 there is a hollow cylinder 40 formed at both ends with trunnions 41 rotatably mounted in eyes 142 depending from the member 39. Within the cylinder 40 there is a rod 42 carrying a series of plungers 43 axially shiftable in transverse bores made in the wall of the cylinder 40. The said bores are in line with the bottom ends of the tapering passages 38, and the top parts of the plungers 43 are spaced from the circumference of the cylinder 40 so as to provide molding chambers 44 receiving the dough supplied through the tapering passages 37, 38.

On one of the trunnions 41 of the cylinder 40 a spur gear 45 is loosely mounted, and the hub of the said spur gear carries a pawl 46 engaging in a ratchet wheel 144 keyed to the trunnion 41. The spur gear 45 is in mesh with a rack 47 jointed at its bottom end to the arm 23, a roller 48 holding the rack 47 in engagement with the spur gear 45. To the ends of the rod 42 transverse rods 49 are secured which projects through bores made respectively in the top and bottom walls of the cylinder 40. At their bottom ends the rods 49 are supported on the top ends of spindles 50 mounted in the frame 1 and adapted to be shifted upwardly and downwardly. As shown the said spindles 50 are shifted by means of a hand wheel 51 carried by a shaft 52 mounted in the frame 1 and carrying helical gear wheels 53 cooperating with helical gear wheels 54. The gear wheels 54 are in the form of nuts screwing on the screw-threaded bottom ends of the spindles 50. The top ends of the rods 49 are engaged by the bottom ends of plungers 55 guided in vertical bores of the members 36 and 39 and of bars 57 rigidly connected by vertical rods 58 with bars 59 mounted near the bottom of the frame 1. As shown the bars 59 are formed with vertical bolts 60 guided in a block 145, and said bars are supported on coiled springs 61 tending to push the same upwardly. Each bar 59 carries a roller 62 engaged by one of the cam disks 10 keyed to the shaft 6.

The spindles 50 carry, at their inner sides, longitudinally slotted arms 63 providing guide ways for rollers 64 rotatably mounted on levers 65, which levers are jointed to the top ends of arms 66 secured at their bottom ends to a shaft 67 rockingly mounted on the frame 1 near the bottom thereof. Each arm 66 carries a roller 68 engaged by one of the cam disks 9. The levers 65 are connected by a wire 69.

The shaft 19 carries two pairs of cam disks 70 and 71 located respectively at opposite ends of the said shaft. The cam disks 70 are engaged by rollers 72 rotatably mounted on levers 73 rockingly mounted on bolts 74 fixed to the frame 1. Near their top ends the levers carry inwardly projecting pins 75 having links 76 jointed thereto, and the said pins are adapted to be shifted longitudinally of the levers by suitable means. For instance the pins 75 may be secured to sleeves 146 slidable on the levers 73 and engaged by screw-threaded spindles 78 carrying hand wheels 77. The links 76 are jointed to a table 79 providing a support for the conveying tape 15 and shiftable on guide ways 80 formed on the frame 1. Helical springs 81 attached to the levers 73 and the frame 1 tend to rock the levers 73 to the right in Fig. 1.

On the cam disks 71 rollers 82 are supported which are rotatably mounted on rails 83 rockingly mounted at 84, and the said rails provide supports for rollers 85 mounted in the bifurcated bottom ends of vertical rods 86. The said rods are guided in bores of lugs 87 carried by the table 79, and are connected at their top ends by a cross-head 88. At their bottom ends the rods 86 are formed with flanges 147, and between the said flanges and the bottom faces of the lugs 87 coiled springs 86' are interposed pushing the rods 86 downwardly and with the rollers 85 into engagement with the rails 83. The cross-head 88 is made integral with two pairs of arms 89 projecting therefrom to opposite sides and formed at their ends with eyes 148 providing guides for vertical plungers 91 bearing on the tape 15 and acted upon by springs 90 holding the tape 15 in engagement with the table 79.

From the cross-head 88 the working head 93 is suspended by means of a chain 92 attached to the top end of a bolt 94 fixed to said head. In the example shown in the figures the working head is of cellular construction and is provided with three series of working cells or cups 95, and formed with a tubular member 96 adapted to be connected to a supply of compressed air, which air passes through openings 97 into the cups 95. In the operation of the machine the compressed air is blown on the wet pieces of dough in order to dry the same on the surface so as to prevent the same from sticking to the cups and to facilitate the removal of the worked pieces of dough from the tape 15.

On the frame 1 a shaft 98 is rotatably mounted, which as shown carries a belt pulley 100 connected by a belt 99 with a suitable source of power. To the said shaft a bevel gear wheel 101 is keyed which is in mesh with a bevel gear wheel 103 loosely mounted on a shaft 102. The hub of the said bevel gear wheel is made integral with a coupling disk 104 adapted for coupling engagement with a disk 105 mounted on the shaft 102. The said disk 105 is longitudinally shiftable but non-rotatable on the shaft 102. The hub of the disk 105 is formed with a circumferential groove 149 engaged by the bifurcated top end of a coupling lever 106 secured to a rock shaft 107. To the said shaft a lever 108 is keyed the top end of which is bent laterally and is disposed between two pins 109 fixed to the rail 83.

On the shaft 102 a helical gear wheel 110 is axially slidable, which gear wheel is in mesh with a helical gear wheel 111 keyed to a vertical shaft 112 mounted in a block 112' made integral with a bracket 151 fixed to the table 79. The said bracket is formed with eyes 150 straddling the gear wheel 110 and adapted to shift the same longitudinally of the shaft 102. On the shaft 112 a disk 113 is mounted which is formed with a recess 114 and carries an eccentric pin 115 having a weighted body 116 loosely mounted thereon. The body 116 is provided with an eccentric pin 117 the eccentricity of which is equal to that of the pin 115 relatively to the disk 113. On the body 116 two bolts 118 and 118' are mounted which extend into the recess 114 of the disk 113. The bolt 118 is fixed to the body 116, while the bolt 118' is adjustable in circumferential direction.

To the pin 117 an arm 119 is pivotally connected the opposite end of which is pivotally connected to a pin 119' fixed to a plate 120. Above the said plate a plate 122 is mounted on the table 79 so as to be shiftable thereon longitudinally of the machine, balls 124 being provided in order to reduce the friction. To the bottom face of the plate 122 rails 121 are fixed which are formed with inwardly directed flanges 152 providing guide ways for the plate 120 in which the said plate is shiftable transversely of the machine, balls 123 being provided between the plate 120, the flanges 152 and the plate 122. The plate 120 carries a bail 125 projecting upwardly therefrom and above the working head 93 and formed with a guide block 126 for the bolt 94.

From the arm 119 two flanges 153 are directed downwardly, which provide a guide way 127 for a roller 128 rotatably mounted on a bolt 129. The said bolt extends downwardly through a guide way 130 provided on the table 79 and a guide way 131 fixed to the frame 1, and is formed with a screw-threaded part 132 carrying an internally screw-threaded hand wheel 133 located between the guide ways 130 and 131.

The operation of the machine is as follows: The dough is filled into the container or hopper 35, and is acted upon by the rollers 32, 33 and 34. By constructing the rollers in the manner shown in the drawings, in which a roller 32 of large diameter is located at one side and rollers 33, 34 of smaller diameter at the opposite side, the dough is thoroughly kneaded by being pressed by the rollers from one side to the other. Thus all the cavities or pores of the dough are brought to uniform size, and the excess of air escapes between the rollers 33 and 34 and through the spaces between the rollers 32, 34 and the member 36. Thus the dough fed from the hopper 35 is divided into batches or portions of uniform size and weight which are subsequently subdivided into individual lumps or loaves. The rollers are intermittently rotated from the shaft 6 through the intermediary of the crank mechanism 7, 20, the arm 21, the block 24, the link 28 and the pawl and ratchet mechanism 29, 140, 141, and the spur gears (not shown) connecting the rollers.

By shifting the block 24 relatively to the arm 21 by means of the spindle 26 the extent of the rotary movement of the rollers can be varied. In the operation of the machine the rollers treat the dough and press the same downwardly until uniform pressure is produced in the mass of dough confined within the passage 37 and the mass of dough within the said passage has at all parts uniform specific gravity and there are no cavities in the mass of dough. Therefore the object of the rollers is not only the feeding of the dough, but their main object is the kneading of the dough so that uniform pieces of the same specific gravity will be divided subsequently from the batch of dough.

Now the dough is conveyed through the passage 38 into the chambers 44. Preferably the rollers 32, 33, 34 are set by means of the hand wheel 25 so that the said rollers tend to convey an excess of dough downwardly beyond what can be filled into the chambers 44. Thus the dough is further compressed into a mass of uniform density. By the next rotation of the crank shaft 6 through an angle of 180° the cylinder 40 is turned through an angle of 180° through the intermediary of the crank disk 7, the link 20, the arm 21, the shaft 22, the crank disk 23, the rack 47, the pinion 45, the pawl 46, the ratchet wheel 144 and the trunnion 41, so that the chambers 44 and the pieces of dough confined therein are directed downwardly. Immediately thereafter the cams 10 engage the rollers 62 and force the bars 59 and 57 and the plungers 55 carried thereby downwardly. Thereby the rods 49 located below the plungers 55 and the rod 42 located within the cylinder 40 are shifted downwardly, so that the plungers 43 are likewise forced downwardly and remove the dough from the chambers 44, the pieces of dough 134 dropping on the conveying tape 15. Should the pieces of dough stick to the plungers 43 they are cut off by the wire 69, which wire is moved across the bottom ends of the plungers 43 by means of the cam disks 9 rocking the levers 65 and arms 66 to the right.

The rollers 32, 33 and 34 are likewise moved from the shaft 6 through the intermediary of the parts 6, 7, 20, 21 operatively connected with the cylinder 40 and the plungers 43, so that the movement of the rollers is in harmony with the movement of the cylinder 40 and the plungers 43, the rollers being rotated and acting on the dough only when the said cylinder and plungers are in the positions in which dough can be forced into the chambers 44. Further, the passage 37 acts as a storage chamber. Therefore the pressure on the dough caused by the feeding movement of the rollers cannot exceed a certain maximum, because the said rollers act on the dough only while the dough is free to yield downwardly and pass into the chambers 44.

By setting the spindles 50 in different vertical positions the size of the pieces of dough 134 divided from the batch of dough can be exactly regulated. The spindles 50 are adapted to be moved upwardly or downwardly by means of the hand wheel 51, thus determining the length of way through which the rods 49, the rod 42 and the plungers 43 are adapted to be shifted downwardly by the plungers 55. Thus an absolutely uniform dividing of the dough is insured.

The transverse member 39 carrying the cylinder 40 is so mounted on the frame 1 that it can be readily removed for mounting a transverse member having a tapering passage 38 and molding chambers 44 of larger capacity, by means of which larger or smaller pieces of dough can be divided from the batch.

The pieces of dough 134 deposited on the conveying tape 15 are carried to the working apparatus and below the working cups 95 which are placed thereon in the manner to be described hereinafter. The tape has a continuous travelling movement.

By the rotary movement of the shaft 19 and the cam disks 70 keyed thereto and engaging the rollers 72, the levers 73 are rocked to the left while putting the springs 81 under tension, and they carry along the table 79, the plungers 91 forcing the tape 15 on the table. This feature is important because thereby the tape lies flat on the table and has no movement of its own relatively thereto while the pieces of dough are worked thereon. The velocity of the table 79 is exactly equal to that of the tape 15. The parts of the working apparatus are moved to the left together with the table 79, because the bail 125, 126 supporting the said parts is connected with the table through the plate 120.

As soon as the levers 73 are at the end of their stroke they are retracted by the springs 81. Prior to the beginning of the return stroke of the levers 73 the cam disks 71 have engaged the rollers 82 and lifted the same together with the rails 83 and the parts supported thereon, that is the rollers 85, the axes 86 and the cross-head 88. Thus the working head 93 and the plungers 91 are lifted. During the first part of the upward movement the working head 93 continues its gyratory movement so that it is readily separated from the pieces of dough. But immediately thereafter the gyratory movement is interrupted, the pins 109 fixed to the rail 83 and engaging the lever 108 forcing the said lever to the left, so that the lever 106 retracts the coupling member 105 away from the coupling member 104.

After the table 79 and the working head 93 have arrived in their initial or right hand position the rollers 82 are released by the cam disks 71, so that the rails 83 are rocked downwardly by gravity. Therefore the working head is placed on the next series of pieces of dough located on the tape 15, and the clutch members 104, 105 are coupled again. Thus the rotary movement of the shaft 98 is against transmitted to the shaft 112 through the intermediary of the shaft 102, and the disk 113 is rotated. The disk 116 which is loosely mounted on the disk 113 remains at rest until one of the end walls of the recess 114 of the disk 113 engages the bolt 118', as is shown in Fig. 9. Now rotary movement is imparted to the disk 116 and the crank pin 117 carried thereby, the said rotary movement being transmitted by the link 119 to the plate 120 and, further, through the intermediary of the bail 125 to the working head 93. The working head is capable of performing gyratory or any other movements, because the plates 120 and 122 permit any movement of the working head in the desired direction, one of the said plates being shiftable longitudinally of the machine and the other one transversely thereof, and anti-friction rollers being provided in order to permit easy movement of the plates.

By uncoupling the members 104 and 105 the rotary movement of the shaft 112 and the disk 113 is interrupted, while the disk 116 continues its rotary movement until the pin 118 engages the end of the recess 114, in which position of the parts the axes of the crank pin 117 and the shaft 112 are in alignment so that the working head and its cups 95 have exactly the median position in which they are adapted to engage the next series of pieces of dough after being returned into initial position. This mechanism is simple in construction and reliable in operation, and permits the operative parts of the working apparatus to be arrested after working exactly in the correct position and at the middle of the movement of the working head. By setting the pin 118' in different positions the stroke of the crank pin 117 and therefore the extent of the working movement of the head 93 can be exactly adapted to the size of the divided pieces of dough 134.

In the position of the parts shown in Fig. 8 the pin 119' and the working head 93 connected therewith perform gyratory movements controlled by the pin 129. During the working movement the table 79 and the guide way 130 carried thereby, the bracket 151 and the parts carried thereby, and the working head 93 move to the left. Therefore, during the whole working operation the position of the pin 129 relatively to the pin 119' remains the same, so that the working operation is unaltered. If however the hand wheel 133 is screwed downwardly on the screw-threads 132, the pin 129 is fixed to the guide way 131 carried by the frame and is arrested while the other parts are shifted to the left. Thereby the distance between the pins 129 and 119' is gradually reduced, and the gyratory movement of the working head is gradually transformed into oval or nearly oval form, until it is rectilinear when the axes of the pins 129 and 119' are in alignment.

Therefore I am enabled to vary the form of the movement of the working head from a gyratory to a rectilinear movement, and I am enabled to cause the working head to perform similar movements, either circular, oval or rectilinear from the beginning of the operation to the end thereof, or to change the circular movement into oval or rectilinear movement.

If it is desired more thoroughly to knead the dough by means of the rollers I provide a larger number of rollers 33, 34 of smaller diameter cooperating with the roller 32 of large diameter.

In Fig. 6 I have shown a modification of the dough kneading and feeding apparatus in which two rollers 135, 136 disposed on the same level and having even diameters are provided. The said rollers are mounted on the transverse bars 57, and take part in the vertical movement thereof, the axes of the rollers being passed through vertical slots (not shown) made in the end walls of the hopper 35. The storage chamber 137 located below the hopper 35 is rectangular in horizontal section, and the area of the said section is equal to the area of the horizontal section of the rollers 135, 136. The axes of the rollers are acted upon by springs 138 tending to push the same apart and into the positions shown in Fig. 6 in dotted lines. When the rollers are shifted upwardly by the bars 57 they are spread apart by the springs 138, and when moving downwardly they slide on the inclined side walls of the hopper 35 and are pushed together into the position shown in Fig. 6 in full lines. When being thus pushed together the rollers force the dough downwardly into the chambers 44, and after being brought into contact with each other they close the chamber 137 at the top thereof so that they are capable of exerting a strong pressure on the dough. It appears therefore that by means of the apparatus shown in Fig. 6 large masses of dough can be exactly divided, and the pressure exerted by the rollers is much higher than the pressure of the rollers 32, 33, 34 of the example shown in Fig. 5.

In the construction shown in Fig. 6 the rollers 135 and 136 may be continuously rotated without endangering the quality of the pieces of dough, provided the rollers have smooth surfaces. For dividing very tough dough I prefer to press the dough into the chambers 44 for a longer time, for which purpose the cam disks 10 are replaced by cam disks having larger circumferences. Thereby I am enabled to divide very tough dough into pieces of uniform size.

In Figs. 10 and 11 I have shown a modification of the driving mechanism of the working apparatus of the machine shown in Figs. 1 to 9. While in the example shown in the latter figures the pin 129 is adapted to be fixed in position by means of a hand wheel 133, the pin 215 shown in Figs. 10 and 11 is mounted on a slide 217 guided in a guideway 218. The slide 217 is connected by a link 219 with a bell crank lever 220 acted upon by a cam disk 221 keyed to a rotary shaft 222, the bell crank lever being held in contact with the cam disk by a spring 223. The shaft 222 is adapted to be rotated either by hand or by an operative part of the machine, and by shifting the slide 217 in its guide way 218 the character of the working operation is varied. I wish it to be understood that the mechanism for varying the character of the working operation may be used in machines of any type.

In Figs. 10 and 11 those parts which are similar to corresponding parts of the machine shown in Figs. 1 to 9 have received similar reference characters, so that it is not necessary to repeat the description of the mechanism.

In Figs. 12 and 14 I have shown a modification of the working apparatus. In the said figures I have shown only the said working apparatus, while the dough dividing apparatus has not been illustrated. But I wish it to be understood that ordinarily I use the machine shown in Figs. 12 to 14 in connection with a dividing apparatus, though my invention is not limited to the use of the working apparatus in connection with the dividing apparatus.

The machine shown in Figs. 12 to 14 is distinguished from the one shown in Figs. 1 to 9 in that the working apparatus comprises a working head constructed in the form of a flexible band trained on a pair of rotary rollers and moving together with the tape conveying the pieces of dough to the working apparatus.

In the frame 231 of the machine a main driving shaft 232 is mounted which carries a pulley 233 adapted to be driven from a suitable source of power. Further, a sprocket wheel 234 and an elongated conical pulley 235 are mounted on the shaft 232. The pulley 235 is connected by a belt 236 with a conical elongated pulley 237 mounted on a shaft 239. A spur gear 238 keyed to the shaft 239 is in mesh with a spur gear 240 keyed to a shaft 241. On the said shaft a sprocket wheel 242 and a spur gear 243 are mounted. The spur gear is in engagement with a spur gear 244 mounted on a shaft 245. A sprocket wheel 246 keyed to the said shaft is connected by a chain 247 with a sprocket wheel 248 mounted on a shaft 248'. A sprocket wheel 249 mounted on the said shaft is connected by a chain 250 with a sprocket wheel 251 keyed to a shaft 252. The sprocket wheel 246 is connected by a chain 253 with sprocket wheels 254 and 255 mounted respectively on shafts 254' and 255'. The said shafts support drums 256 and 257 having conveying tapes 258 and 259 mounted thereon. The tape 258 is provided for conveying baker's plates or boards, and the tape 259 is guided on rollers 260, 260' and 261, and passes over a blade 262.

On brackets 263 projecting laterally from the frame 231 a table 265 is mounted for being shiftable in any direction, balls 264 being interposed between the table and the brackets in order to reduce friction. On the frame 231 shafts 266 and 267 are mounted, which are in driving engagement with short shafts 272 and 273 through bevel gear wheels 268, 270 and 269, 271. The shafts 272, 273 are mounted in transverse members 274 and 275. To the bevel gear wheel 270 a crank pin 276 is fixed, while the bevel gear wheel 271 has a crank pin 277 adjustably mounted thereon. The crank pins 276 and 277 are in driving engagement with the table 265, the pin 276 engaging in a cylindrical bore of the said table, while the pin 277 engages in a slot 278 disposed in the direction of the movement of the upper conveying tape 259. The shafts 266 and 267 are driven from the main driving shaft 232 by means of sprocket wheels 279, 280, a chain 281 and the sprocket wheel 234. The shaft 252 is mounted on the table 265. At the end of the table remote from the said shaft a second shaft 282 is mounted, and the shafts 252 and 282 carry pairs of sprocket wheels 283 and 284. On the sprocket wheels two chains 285 and 286 are trained the links of which carry transverse bars 287 formed with holes 288 of square, hexagonal or similar suitable configuration. Further, two drums 289 are secured to the shafts 252 and 282 between the sprocket wheels 283 and 284, and on the said drums a tape 290 is trained, the lower run of which is adapted to close the holes 288 of the bars 287 by gravity. In some cases means are provided for pressing the tape on the said bars. The tape 259 and the chains 285 and 286 are moved at equal velocity, the said velocity being adapted to be regulated by shifting the belt 236 on the drums 235 and 237.

In the operation of the machine the rotary driving shaft 232 moves the tapes 258, 259 and 290 at the same velocity. Further, it imparts working movement to the table 265 carrying the top part of the working apparatus, by means of the crank pins 276 and 277, the right hand end of the said table having circular movement imparted thereto, while the left hand end receives either circular, oval or longitudinal reciprocating movement according to the position of the crank pin 277. If now divided pieces of dough are placed on the tape 259, which may be done either by hand or by means of the dividing apparatus of the construction shown in Figs. 5 and 6, the said pieces of dough will enter the holes 288 of the bars 287, and will be worked by the said bars and the tape 290 bearing thereon while being conveyed through the working apparatus by means of the tape 259. At the beginning of the operation the pieces of dough are worked into round form, and the working movement may remain circular to its end, or it may gradually be changed into oval or longitudinal working movement, according to the position of the crank pin 277. For working the pieces of dough into longitudinal form the pin 277 is set coaxially of the shaft 273. Oval working operation is obtained by setting the crank 277 so that its path is smaller than that of the crank 276. The number of the working operations can be changed by increasing or reducing the velocity of the conveying tapes, which may be done by shifting the belt 236 on the conical drums 235 and 237. Since the number of revolutions of the working movement is controlled by the driving shaft 232, and is always alike, the time in which the pieces of dough pass through the working apparatus may be shorter or longer, so that the number of the working movements may be varied. It will be understood that the number of the working operations can also be varied by changing the number of the revolutions of the working apparatus, while the velocity of the conveying tapes is not altered.

The worked loaves are deposited by the band 259 on plates or boards carried through the machine by means of the conveying tape 258.

In Figs. 15 to 18 I have shown a modification which comprises two movable working heads of a construction similar to the one described with reference to Figs. 12 to 14, the first of the said heads working the pieces of dough into round form, while the second works the same into longitudinal form.

In the machine frame 301 a main driving shaft 302 is mounted, which carries a belt pulley 303, bevel gear wheels 304 and a stepped pulley 305. The bevel gear wheels 304 are in engagement with bevel gear wheels 306 keyed to vertical shafts 307 carrying at their top ends cranks 308 and crank pins 309. The crank pins 309 engage in bores made in a table 310. Thereby circular movement is imparted to the said table. To a pin 311 depending from the said table a link 312 is jointed which is formed with a slot 313 engaging a pin 314 fixed to a transverse bar 315 mounted on the machine frame 301. The free end of the link 312 is jointed by means of a bolt 317 to a link 316 connected by a bolt 318 with a table 319. The table 319 is guided on the machine frame 301 so as to be capable only of transverse movement. If now gyratory movement is imparted to the table 310 reciprocating movement is transmitted through the mechanism just described to the table 319. The tables 310 and 319 are formed each with four arms 299 providing bearings for transverse shafts 320, 321 and 320', 321'. On drums 298 mounted on the said shafts conveying tapes 322 are trained, the upper branches of which are supported on tables 323.

The stepped pulley 305 is connected by a belt 324 with a stepped pulley 325 keyed to a shaft 326. On the said shaft a worm 327 is mounted which is in driving engagement with a worm wheel 328 keyed to a shaft 329 disposed longitudinally of the machine and having bevel gear wheels 330, 331, 332 keyed thereto. The gear wheel 330 is in mesh with a gear wheel 333 keyed to a shaft 335 having a drum 334 mounted thereon. A sprocket gear wheel 336 keyed to the shaft 335 is connected by a chain 337 with a sprocket wheel 338 keyed to a shaft 339 which shaft carries a drum 340. On the drum 334 a tape 341 is trained by means of which bakers' boards or plates 342 are carried through the machine. On the drum 340 a tape 343 is trained which is guided on a roller 344 and a blade 345.

The bevel gear wheel 331 is in mesh with a bevel gear wheel 346 keyed to a flexible shaft 347. To the top end of the said shaft a bevel gear wheel 348 is keyed in mesh with a bevel wheel 349 which is secured to the shaft 320 carrying one of the drums 298. The bevel gear wheel 332 is in mesh with a bevel gear wheel 350 keyed to a flexible shaft 351. To the top end of the said shaft a bevel gear wheel 352 is secured which is in mesh with a bevel gear wheel 353 keyed to the shaft 320' carrying one of the drums 298. On the table 310 working bars 354 are supported which are disposed exactly above the tape 343, and which are covered at their tops by the tape 322. Similar working bars are provided in the second working apparatus. Thus the shaft 329 drives the conveying tapes 341, 343 and 322 at equal velocity.

In connection with the machine shown in Figs. 15 to 18 dough dividing means such as have been described above are provided.

In the operation of the machine the divided pieces of dough are placed on the conveying tape 343 and carried thereby to the first of the working heads where they pass between the bars 354, as is shown in Fig. 17. After being worked between the bars 354 of the first working head the pieces of dough pass between the bars 354' of the second head. As shown the said bars are formed with tapering ends so that the pieces of dough can smoothly get between the same. While in the first head the pieces of dough are worked into round form, the second working head imparts an oblong form thereto, the second head having reciprocating movement transversely of the tape 343. After leaving the second working head the worked pieces of dough are deposited on the boards or plates 342.

Preferably the bars 354 have their bottom edges rounded, as is shown in Fig. 18. Ordinarily the gravity of the tape 322 is sufficient to exert the pressure necessary for working. But in some cases I provide additional pressing means such as rollers.

By means of the stepped pulleys 305 and 325 the velocity of the conveying tapes may be increased or reduced for varying the effect of the working operation.

In the example shown in Figs. 15 to 18 the tables 310 and 319 move in opposite directions, which however, is not objectionable. But in some cases I provide driving mechanism by means of which the slides are uniformly reciprocated. From the foregoing it will be understood that the table 310 has gyratory movement.

While in describing the invention reference has been made to particular examples embodying the same I wish it to be understood that my invention is not limited to the constructions shown in the drawings, and that various changes may be made in the general arrangement of the apparatus and the construction of its parts without departing from the invention.

I claim:

1. In a dough working apparatus, the combination with the working member, of driving mechanism therefor including a rotary member having an eccentric pin, a weighted body mounted on such pin, a crank pin on said weighted body having an eccentricity substantially equal to the eccentricity of said eccentric pin, a link connecting said crank pin on said weighted body with said working member, said weighted body being rotatable relatively to said rotary member within definite limits.

2. In a dough working apparatus the combination with the working member, a driving mechanism therefor including a rotary member having an eccentric pin, a weighted body mounted on such pin and formed with two stops circumferentially spaced from each other, a stop provided on said rotary member in position for engagement with said stops on the weighted body, a crank pin on said weighted body having an eccentricity substantially equal to the eccentricity of said eccentric pin, a link connecting said crank pin on said weighted body with said working member, said weighted body being rotatable relatively to said rotary member within definite limits.

3. In a machine of the class described, a traveling member for conveying dough portions, a carrier arranged at one side of said member, a support arranged to engage the other side of said member, dough-working mechanism mounted on said carrier movably, and operative connections for moving said carrier and said support in unison and to cause them to travel, for a time, in the same direction as the conveyer member, during the operation of the dough-working mechanism.

4. In a machine according to claim 3, operative connections which cause the carrier and support, at the time they move in the same direction as the conveyer member, to travel at the same speed as said member.

5. In a machine of the class described, a traveling member for conveying dough portions, and a dough-working device, arranged to operate on dough portions carried by said conveying member, said device being provided with means for introducing air under pressure into contact with the dough portions.

6. In a machine of the class described, a traveling member for conveying dough portions, a carrier mounted to move at one side of said conveyer and parallel to the path thereof, dough-working mechanism mounted on said carrier movably and co-operating with a portion of said conveyer to work the dough portions thereon, mechanism for causing said carrier to move, for a time, in the same direction as said conveying member, during the operation of the dough-working mechanism, and means for causing the carrier to move in the opposite direction to the conveying member while the dough-working mechanism is inactive.

7. A machine of the class described, comprising a traveling conveyer, means for delivering dough portions to said conveyer successively, a dough-working mechanism arranged adjacent to a different portion of the conveyer to co-operate with such conveyer portion in working the dough portions thereon, and movable bodily with the conveyer during the working period of such dough-working mechanism, and means for moving said mechanism, at the end of such period, first away from the conveyer and then lengthwise thereof in a direction opposite to the movement of the conveyer.

8. A dough working apparatus according to claim 2, in which the distance between the two stops is adjustable to vary the throw of the crank pin and thereby the extent of the movement of the working member.

9. A dough working machine according to claim 1, in which the link is pivoted about a pin adjustable lengthwise of such link between the axis of the working member and a point situated toward the axis of the crank pin.

10. A machine of the class described, comprising a traveling conveyer, a working member arranged on one side of said conveyer and adapted to work dough portions placed on said side of the conveyer, a table arranged on the opposite side of the conveyer, and pressure members associated with said working member and arranged to urge the conveyer against said table at points in advance and in the rear of said working member.

OTTO KREMMLING.